United States Patent [19]

Lewis

[11] Patent Number: 4,913,539
[45] Date of Patent: Apr. 3, 1990

[54] APPARATUS AND METHOD FOR LIP-SYNCHING ANIMATION

[75] Inventor: John P. Lewis, Port Washington, N.Y.

[73] Assignee: New York Institute of Technology, Old Westbury, N.Y.

[21] Appl. No.: 176,843

[22] Filed: Apr. 4, 1988

[51] Int. Cl.⁴ .................................... G03B 21/32
[52] U.S. Cl. .............................. 352/87; 352/5; 352/50; 352/52; 352/54
[58] Field of Search ............ 352/87, 50, 51, 52, 352/54, 5

[56] References Cited

U.S. PATENT DOCUMENTS

| | | | |
|---|---|---|---|
| 3,624,302 | 11/1971 | Atal | 179/1 SA |
| 3,662,374 | 5/1972 | Harrison et al. | 340/324 A |
| 4,038,495 | 7/1977 | White | 179/1 SA |
| 4,070,709 | 1/1978 | Roberts et al. | 364/602 |
| 4,191,853 | 3/1980 | Piesinger | 179/15 A |
| 4,260,229 | 4/1981 | Bloomstein | 352/50 |
| 4,389,540 | 6/1983 | Nakamura et al. | 179/1.5 A |
| 4,544,919 | 9/1985 | Gerson | 340/397 |
| 4,600,281 | 7/1986 | Bloomstein | 352/50 |
| 4,661,915 | 4/1987 | Ott | 364/513.5 |

OTHER PUBLICATIONS

A. Pearce et al., "Speech and Expression: A Computer Solution to Face Animation, Graphics Interface", 1986.

*Primary Examiner*—Monroe H. Hayes
*Attorney, Agent, or Firm*—Martin M. Novack

[57] ABSTRACT

The disclosed invention takes advantage of the fact that the speech information and processing needed for successful animation lip-synching is actually much less than the information and processing which is needed for identifying individual words, as in the traditional speech recognition task, The disclosed embodiment utilizes linear prediction to obtain speech parameters which can be used to identify phonemes from a limited set corresponding to visually distinctive mouth positions. In the disclosed embodiment there is set forth an apparatus for producing lip-synching for a spoken sound track. Means are provided for storing, for each of a number of mouth positions, an unvoiced phonetic information representation associated with a mouth position. Means, responsive to samples of sound from the sound track, are provided for generating unvoiced phonetic information signals for the samples. Further means are provided for comparing the unvoiced phonetic information signals with the stored unvoiced phonetic information representations to determine which of the stored representations most closely matches the unvoiced phonetic information signals. The determined representations are then stored in time correspondence with the sound track.

19 Claims, 5 Drawing Sheets

APPARATUS AND METHOD FOR LIP-SYNCHING ANIMATION

BACKGROUND OF THE INVENTION

This invention relates to an apparatus and method for automatically producing lip-synching between facial animation and a spoken sound track.

There are a number of existing techniques for synchronizing facial animation to a spoken sound track (which, as used herein, is intended to generically include any live or recorded acoustical or electrical representation of communicative sounds). In the common rotoscoping method, an actor saying the dialog is filmed, and the actor's mouth positions are copied onto the animated character. This, and other manual techniques, have the obvious disadvantage of high cost in labor and time.

In Pearce et al., "Speech And Expression: A Computer Solution To Face Animation", Proceedings, Graphics Interface, 1986, there is described an approach to synchronized speech in which a phonetic script is specified directly by the animator. The phonetic script is also input to a phoneme-to-speech synthesizer, thereby achieving synchronized speech. This approach is appropriate when the desired speech is specified in textual form, and the quality of rule-based synthetic speech is acceptable to the purpose. A drawback of this approach is that it is difficult to achieve natural rhythm and articulation when the speech timing and pitch is defined in a script or derived by a rule-based text-to-speech synthesizer. The prosody quality can be improved somewhat by adding information such as pitch and loudness indications to the script.

In the U.S. Pat. No. 3,662,374 of Harrison et al., there is disclosed a system for automatic generation of mouth display in response to sound. Speech sounds are filtered by banks of filters, and a network of potentiometers and summers are used to generate signals that automatically control mouth width and upper and lower lip movement of an animated mouth.

In the U.S. Pat. No. 4,260,229 of Bloomstein, there is disclosed a system wherein speech sounds are analyzed, digitally encoded, and transmitted to a data memory device that contains a program for producing visual images of lip movements corresponding to the speech sounds. In this patent it is stated that an actor speaks and his voice is encoded into a phoneme code which includes sixty-two phonemes (for the English language). Each phoneme is coded at a desired number of frequencies, three being specified as an example. A commercially available speech encoder is suggested for the job. A drawback of this system, however, is the need for such a sophisticated speech encoding capability, with its attendant cost and processing time.

The U.S. Pat. No. 4,600,281 of Bloomstein discloses a method for altering facial displays in cinematic works which does not use phonetic codes.

It is among the objects of the present invention to provide an improved automatic lip-synching apparatus and method which provides realistic representations of mouth movements, but without undue cost, complexity, or operating time requirements.

SUMMARY OF THE INVENTION

The present invention takes advantage of the fact that the speech information and processing needed for successful animation lip-synching is actually much less than the information and processing which is needed for identifying individual words, as in the traditional speech recognition task. The disclosed embodiment utilizes linear prediction (a well known technique, usually used for speech synthesis) to obtain speech parameters which can be used to identify phonemes from a limited set corresponding to visually distinctive mouth positions.

Linear prediction models a speech signal as a broadband excitation signal that is input to a linear autoregressive filter. This provides an abstracted but fairly accurate model of speech production, in which the filter models the vocal tract (mouth, tongue, and lip positions) and the excitation signal approximates the acoustic signal produced by the vocal cords. In the present invention, the latter portion (voicing) is removed from consideration; i.e., the pitch information is convolved out. The remaining information, pertaining to the vocal tract model is advantageously used in a limited matching process that would not be of much use in recognizing vocabulary words, but is sufficient to recognize the sounds associated with the basic visually distinctive mouth positions. [As used herein, the term "mouth position" is intended in a non-limiting sense to include the position, orientation or shape of the mouth, lips, tongue, and teeth.]

In accordance with an embodiment of the invention, there is set forth an apparatus for producing lip-synching for a spoken sound track. Means are provided for storing, for each of a number of mouth positions, an unvoiced phonetic information representation associated with a mouth position. Means, responsive to samples of sound from the sound track, are provided for generating unvoiced phonetic information signals for the samples. Further means are provided for comparing the unvoiced phonetic information signals with the stored unvoiced phonetic information representations to determine which of the stored representations most closely matches the unvoiced phonetic information signals. The determined representations are then stored in time correspondence with the sound track.

In a preferred embodiment of the invention, the means responsive to samples of sound is operative to generate the unvoiced phonetic information signals as linear predictive coding signals representative of a vocal tract filter.

Further features and advantages of the invention will become more readily apparent from the following detailed description when taken in conjunction with the accompanying drawings.

DESCRIPTION OF THE PREFERRED EMBODIMENT

Figure 1:
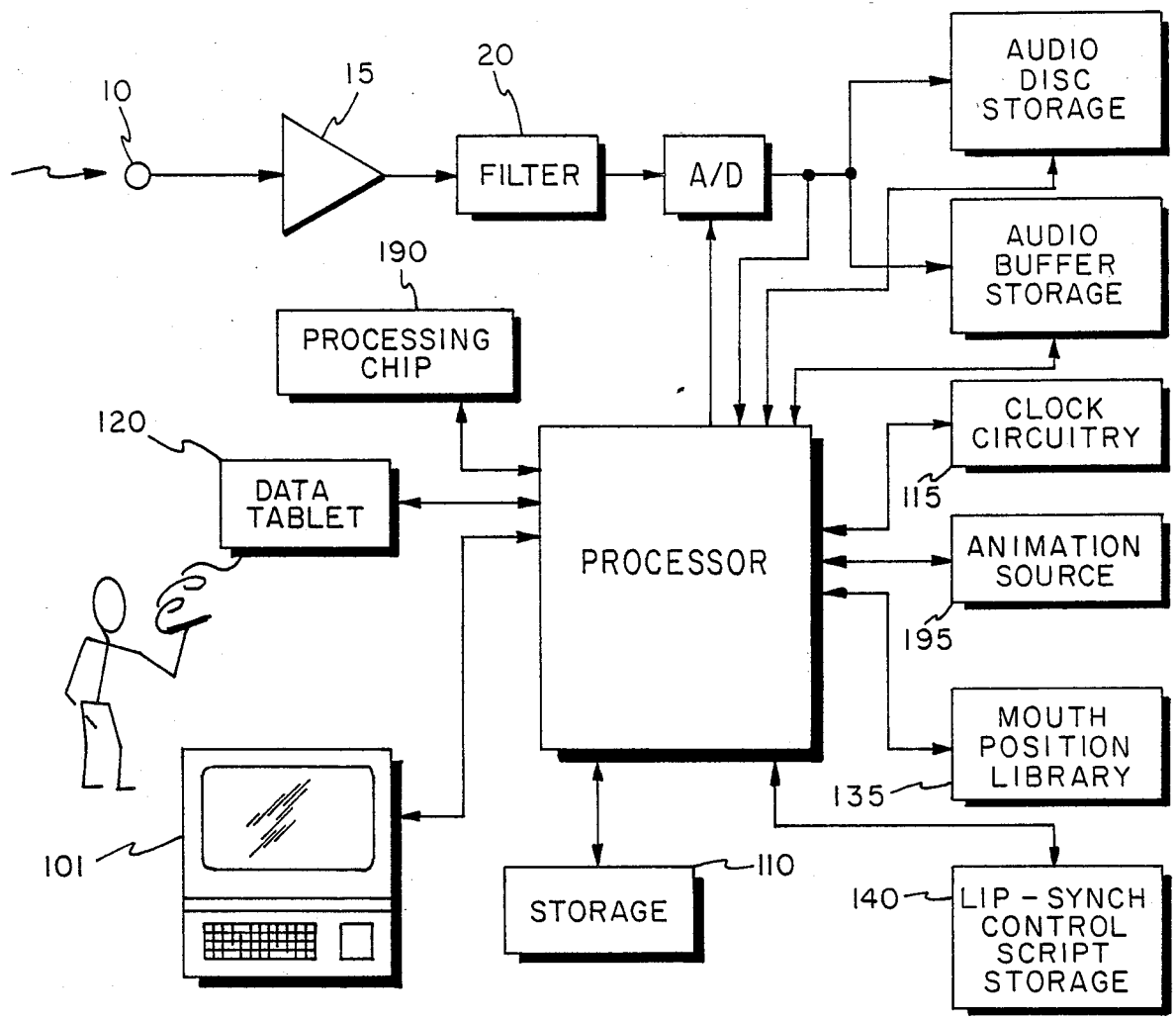
FIG. 1 is block diagram of an apparatus in accordance with an embodiment of the invention, and which, when suitably programmed, can be used to practise the method of the invention.

Referring to FIG. 1, there is shown a block diagram of an apparatus in accordance with an embodiment of the invention and which, when properly programmed, can be utilized to practise a method in accordance with the invention. A transducer, such as a microphone 10, receives input sounds and produces electrical signals that are representative of the received sounds. The microphone output is amplified by preamplifier 15, and filtered by low-pass filter 20 which, in the present embodiment, is low-pass at 5000 Hz. The output of filter 20 is coupled to analog-to-digital converter 25.

In the embodiment of FIG. 1, a processor 100 is provided, and is programmed, in a manner to be described, to control operation of other elements of the FIG. 1 embodiment, and to also perform various computations which are utilized in processing speech signals and selecting lip synch mouth positions for a control script. In an embodiment of the invention, the processor used was a model VAX-780, sold by Digital Equipment Corp. The processor 100 is typically provided with input/output means 101, which includes a keyboard and monitor, general storage 110 (including RAM and non-volatile storage), and clock circuitry 115. The embodiment of FIG. 1 also shows a data tablet 120 as a further input-generating device, and individual memories identified as audio storage buffer 125, audio disc storage 130, mouth position library 135, and lip-synch control script storage 140. The analog-to-digital converter 25 is coupled to processor 100 and to storage 125 and 130, and is also under control of processor 100. It will be understood that any suitable processor and peripherals can be utilized, consistent with the principles of the invention as set forth. The indicated separate memories facilitate understanding of operation of the invention, but the number, size, and type of memories employed is a matter of design choice.

Figure 5:
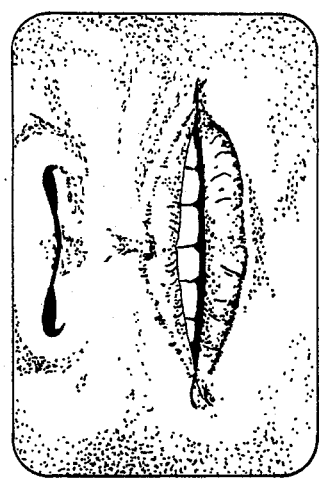
FIG. 5 is shows examples of visually distinctive mouth positions and sounds which result in the respective positions.
Figure 5:
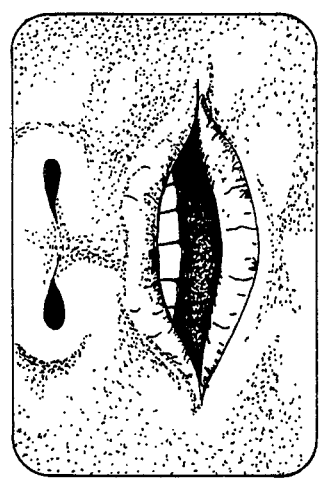
Figure 5:
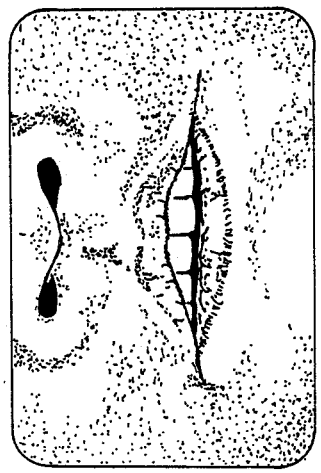
Figure 5:
Figure 5:
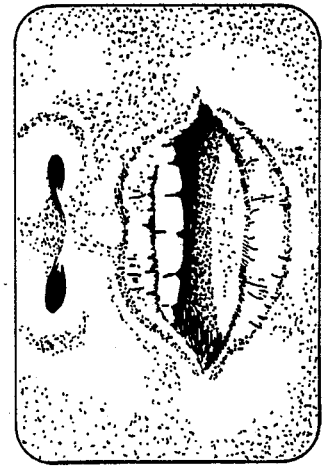
Figure 5:
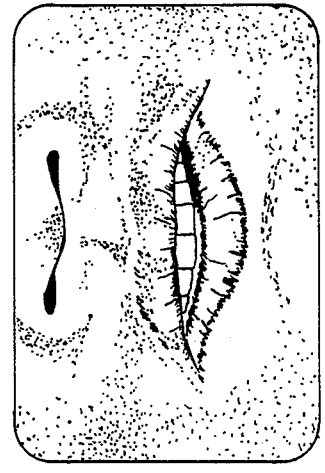

In the present embodiment of the invention, a training mode is used to store, for each of number of visually distinctive mouth positions, an unvoiced phonetic information representation. Preferably, although not necessarily, the training utterances are spoken by the person who will be speaking on the sound track to be lip synched. In the present embodiment, eleven training utterances are used, and these correspond to eleven visually distinctive mouth positions. FIG. 5 shows an example of some of the characteristic mouth positions and the sounds which produce these positions. [These are available in standard "How To Read Lips" texts.] It will be understood, however, that the principles of the invention apply to any suitable number of mouth positions, and corresponding unvoiced phonetic features. Also, in the example of FIG. 1, the basic mouth positions are sketched by an animator (e.g., from viewing the mouth of the speaker, existing sketches, etc.), and stored in mouth position library 135. Alternatively, graphical representations of mouth positions, from any suitable source, can be stored before, during, or after the present procedure, and utilized when the lip-synching script is employed to compile the completed combination of video and sound track.

During the second mode of operation of the invention, called the "production mode", the sound track for which lip-synching is to be implemented is processed to obtain a lip-synch control script; i.e., in the present embodiment, a sequence of output indications, synchronized in time with the sound track timing, which indicate the mouth position information at each point of the sound track. It will be understood that if a sound track can be lip-synched quickly and efficiently, there is little further advantage to achieving the result in "real time". In the present embodiment, a sound track can be processed "on the fly", e.g. by using the indicated buffering, or a pre-recorded sound track can be processed at a convenient rate, depending upon the computational speed and memory of the computing system utilized and the need and desire for production speed. Thus, although one of the advantages of the invention resides in the efficiency and reduced complexity of processing, the invention does not depend upon the particular source or type (e.g. live, recorded, or mixed) of sound track to be lip-synched.

Figure 2:
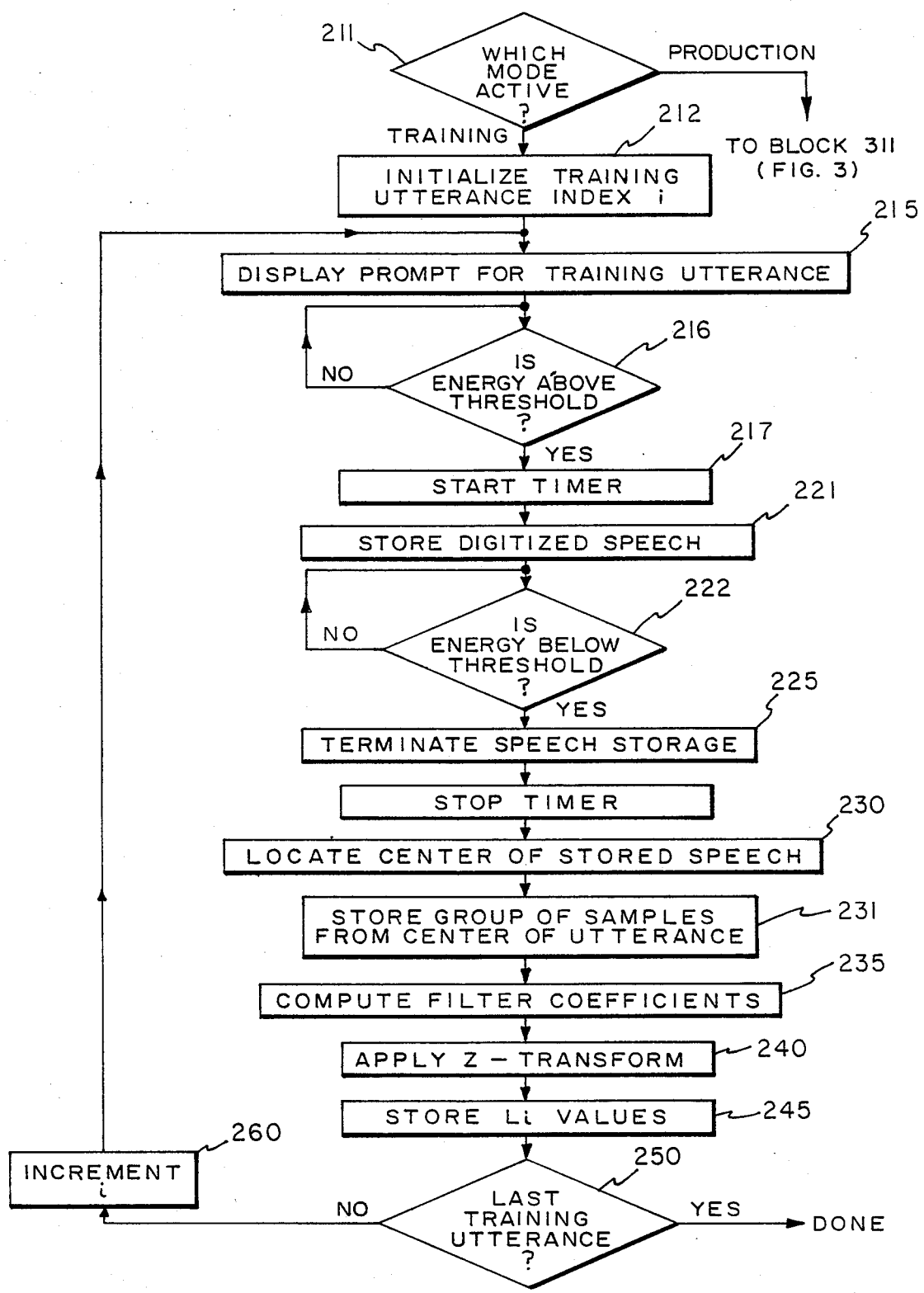
FIG. 2 is a flow diagram of a routine for programming the processor of FIG. 1 to implement the training mode an embodiment of the invention.

Referring to FIG. 2, there is shown a flow diagram of a routine for programming the processor 100 of FIG. 1 to implement an embodiment of the invention. The diamond 211 represents selection of the operational mode which is active; namely, the so-called "training" mode or the so-called "production" mode. If the production mode is active, the block 311 is entered (see FIG. 3 below). When the training mode is active, the block 212 is entered, this block representing the initiation of a training utterance index i. In the example of the present embodiment, eleven training utterances, corresponding to eleven visually distinctive mouth positions, are utilized, although any suitable number can be used. A prompt is displayed indicating the next training utterance to be spoken (block 215); i.e., one which has a central sound that characterizes the current mouth position. The energy level of the speech is then monitored (diamond 216), until it is determined that the training utterance has begun, whereupon a timer is started (block 217). The digitized speech (output of analog-to-digital converter 25 in FIG. 1, or previously recorded) is then stored, such as in buffer 125, and this continues until the energy of the received utterance falls below a predetermined threshold (diamond 222), whereupon storage is terminated (block 225) and the timer is stopped (block 226). The block 230 is then entered, this block representing the locating of the approximate center of the stored speech, which is determined from one-half the timer count. A group of digitized speech samples from the center of the utterance are then stored, as represented by the block 231. In the present embodiment the sampling rate of the analog-to-digital converter is 15 KHz, and there are 60 8-bit sample groups per second. Accordingly, each sample group has 250 samples. One approximately central group of 250 samples (as stored via block 231) is subsequently processed.

The next portion of the routine of FIG. 2 involves the analysis of the stored sample group to obtain a parameter set which represents the linear predictive coding ("LPC") coefficients for this group of speech samples, in the frequency domain. This processing, per se, is well known in the art, and is described, for example, in Markel and Gray, "Linear Prediction of Speech", Springer-Verlag, New York, 1986. Reference can also be made to the following U.S. Patents which describe LPC processing: U.S. Pat. Nos. 3,624,302, 4,038,495, 4,191,853, 4,070,709, 4,389,540, 4,544,919, and 4,661,915.

It will be understood that other suitable means can be utilized to obtain unvoiced phonetic characteristics. In FIG. 2, the block 235 represents the computation of LPC coefficients for the stored group of speech samples. In an embodiment hereof, a program called "AUTO" (Programs For Digital Signal Processing", IEEE Press, 1979) was utilized to obtain the LPC coefficients, as twelve 32-bit numbers. A processing chip, namely a Texas Instruments Model 320 DSP chip (illustrated in FIG. 1 as processing chip 190), was then utilized in obtaining a Z-transform, as represented in FIG. 2 by the block 240. In the embodiment hereof, the Z-transform produces a filter response characteristic in the frequency domain, and thirty-two points thereon are output as representing the unvoiced phonetic filter characteristic, as a function of frequency. Each of these points is set forth as a 32 bit number. Accordingly, after the processing indicated by blocks 235 and 240, the result is a numerical representation (thirty-two 32-bit numbers) which represent the unvoiced phonetic features of the reference utterance i that corresponds to a particular mouth position, i. This set of numbers, designated $L_i$, is stored, as represented by the block 245. Inquiry is then made (diamond 250) as to whether the last training utterance has been processed. If not, the index i is incremented, and the block 215 is reentered, whereupon the loop 290 continues until a set of numbers $L_i$, has been obtained for each of the training utterances.

Figure 3:
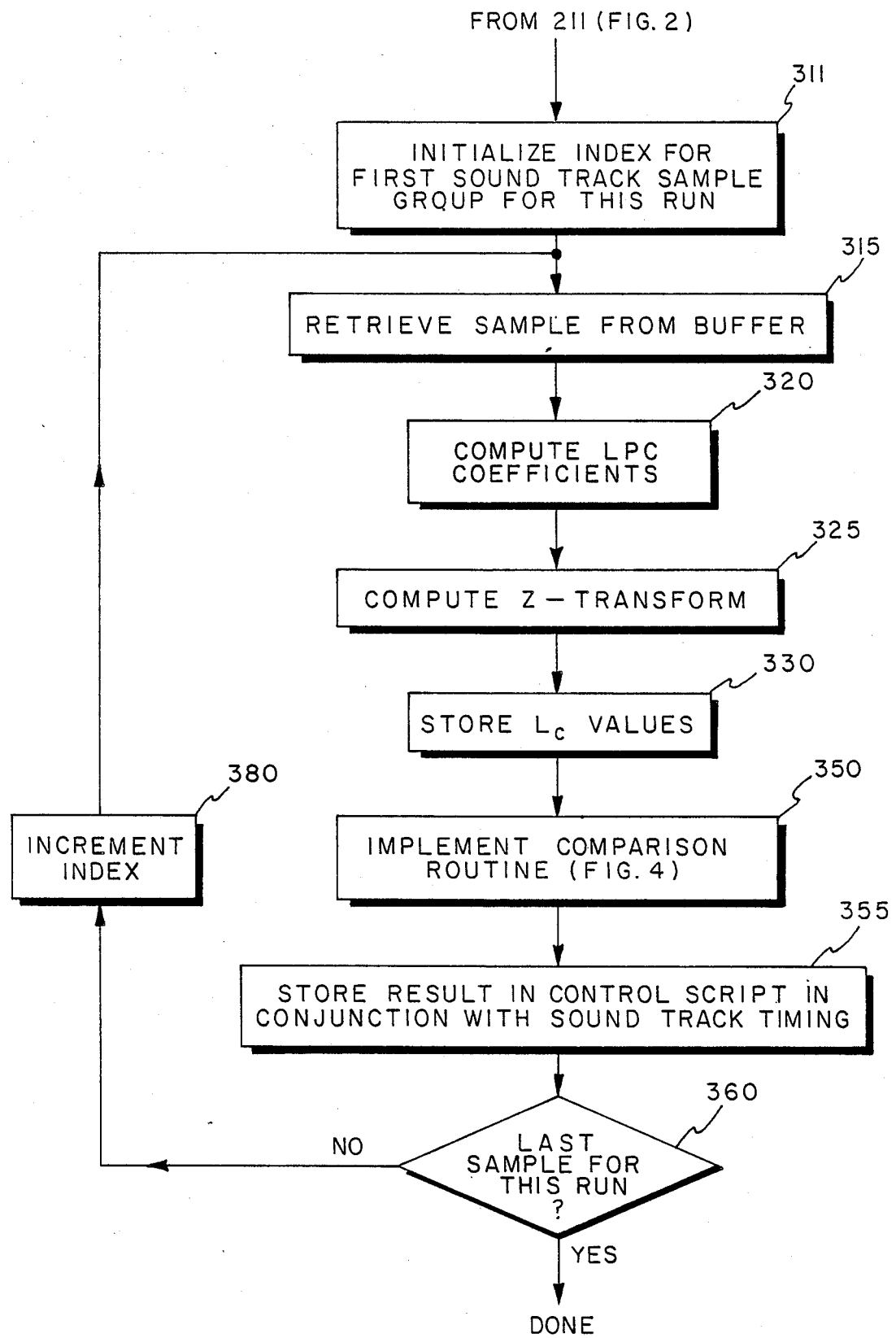
FIG. 3 is a flow diagram of a routine for programming the processor of FIG. 1 to implement the production mode of an embodiment of the invention.

Referring to FIG. 3, there is shown a flow diagram of the so-called "production" portion of the routine. The block 311 is entered (from diamond 211 of FIG. 2), this block representing the initiation of the index for the first group of sound track samples for the present production run; i.e., the beginning of the section of sound track that is to be processed to obtain output mouth positions. In the description of the flow diagram of FIG. 3, it is assumed that the low-pass filtered and digitized samples from the sound track have been stored in buffer memory 125 (or are being stored as processing proceeds) but, as noted above, the source or storage status of the sound track does not affect the principles of the invention. After the index is initiated (block 311), the group of samples identified by the index is retrieved from the buffer, as represented by the block 315. The LPC coefficients for the sample group are then computed (block 320), and the Z-transform is computed to obtain the numerical values for the unvoiced phonetic characteristic of the this group of samples. These computations are the same as those described above in conjunction with blocks 235 and 240, respectively, of FIG. 2. The resultant set of numbers for the current sample group, designated as $L_c$, is stored (block 330), and a comparison routine (block 350) is then performed to determine the best match between $L_c$ and the stored unvoiced phonetic characteristic, $L_i$, associated with each of the candidate mouth positions. The routine of block 350 is described in conjunction with FIG. 4. The result of the comparison, which is a selection of one of the eleven (in this embodiment) mouth positions, is then stored (block 355) in a control script (block 140, FIG. 1) in conjunction with the sound track timing information. Accordingly, each 1/60 second on the sound track control script will have a designation of a mouth position that is associated with that 1/60 second interval on the sound track. Inquiry is then made (diamond 360) as to whether the last sample group for this run has been processed. If not, the sound track sample group index is incremented (block 380), and the block 315 is again entered for retrieving of the sample group, and continuing of the loop 375 for processing of each sample group in this run.

Figure 4:
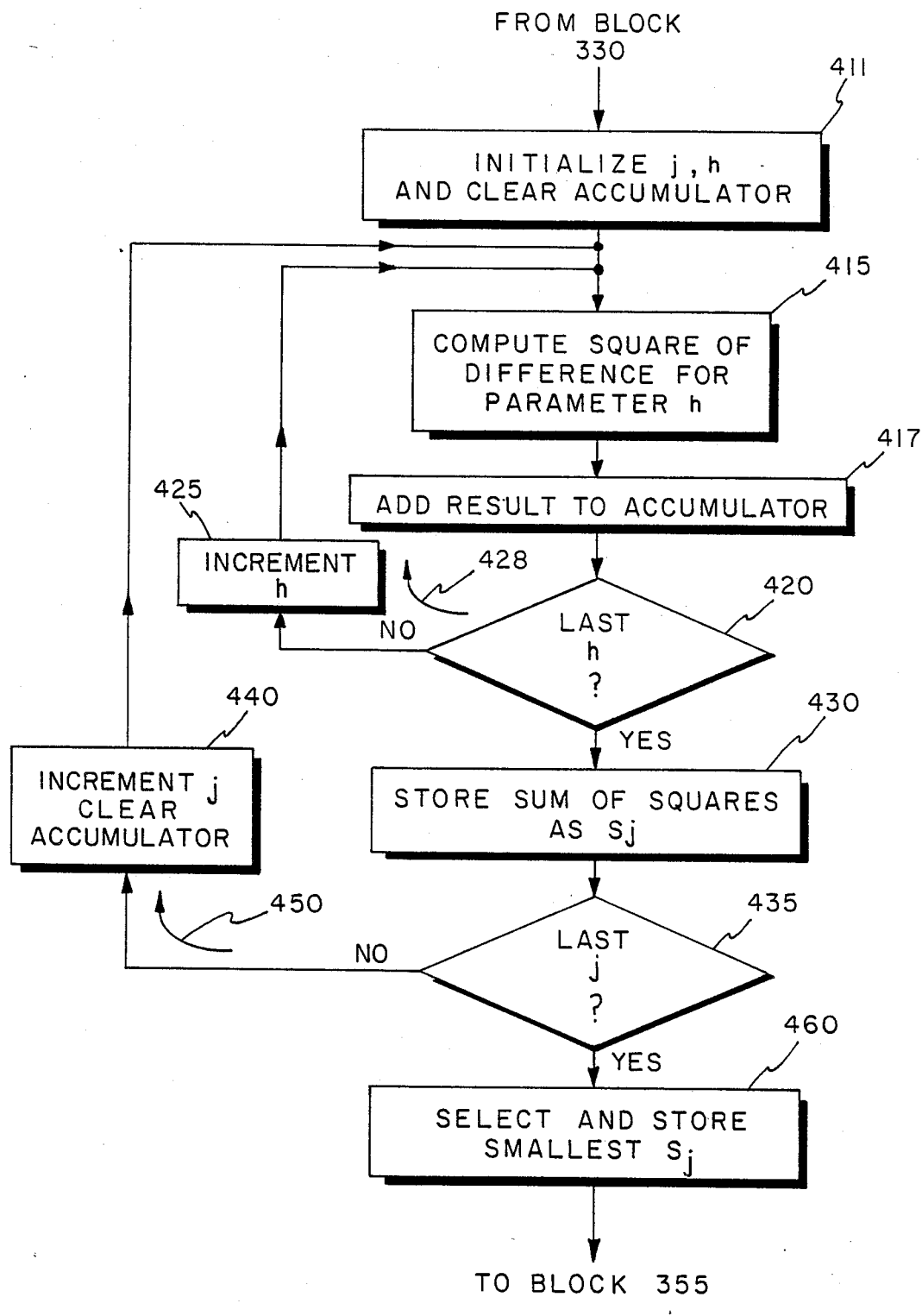
FIG. 4 is a flow diagram of the comparison routine of the FIG. 3 flow diagram.

Referring to FIG. 4, there is shown a flow diagram of the comparison routine represented by the block 330 of FIG. 3. The block 411 represents the initialization of the candidate index j, the initialization of the spectral parameter index h (i.e., the parameters defining the spectral LPC characteristic, as represented by the 32 numbers in the present embodiment), and the clearing of an accumulator. The block 45 is then entered, and for the candidate j (that is, the first of the eleven stored training word possibilities, in the present embodiment), the square of the difference is computed for the first spectral parameter h. The result is then added to the accumulator (block 417), and inquiry is made (diamond 420) as to whether the last h has been considered. If not, h is incremented (block 425), and the loop 428 is continued until the sum of squares of differences has been obtained (in the accumulator) for the first training sound candidate [which is also the first mouth position candidate]. The sum stored in the accumulator is stored as the sum of squares of differences, called $S_j$ (block 430). Inquiry is then made at (diamond 435) as to whether the last candidate has been considered. If not, the candidate index j is incremented and the accumulator is cleared (block 440). The loop 450 is candidate j. The smallest $S_j$ is then obtained and stored, as represented by block 460.

After obtainment of the control script (block 140, FIG. 1) standard computer graphics techniques can be utilized in compiling the lip-synched animation using the control script, the mouth position library (block 135, FIG. 1), and a source of animation on which the mouth positions are to be superimposed (block 195, FIG. 1).

The invention has been described with reference to a particular preferred embodiment, but variations within the spirit and scope of the invention will occur to those skilled in the art. For example, it will be understood that silence or low acoustic energy in the sound track will be routinely translated as a closed mouth position, and that sharp discontinuities in mouth position can be smoothed out. In this regard, it may be useful, for example, to retain the second best match candidate mouth position, and the matching scores of the first and second best matches, so that the second best match would be considered in the event of an unnatural seeming sharp discontinuity of mouth position. Also, it will be understood that a speech synthesizer can be used, if desired, to synthesize the sound track from the LPC information, although this is not preferred. Finally, it will be recognized that the frequencies and sampling rates and groups set forth are exemplary, and are not intended in a limiting sense. A degree of trade-off between processing complexity and accuracy will be apparent.

What is claimed:

1. Apparatus for producing lip-synching for a spoken sound track, comprising:
    means for storing, for each of a number of mouth positions, an unvoiced phonetic information representation associated with a mouth position;
    means responsive to samples of sound from the sound track for generating unvoiced phonetic information signals for the samples;
    means for comparing said unvoiced phonetic information signals with the stored unvoiced phonetic information representations to determine which of the stored representations most closely matches the unvoiced phonetic information signals; and
    means for storing the determined representations in time correspondence with the sound track.

2. Apparatus as defined by claim 1, wherein said means responsive to samples of sound is operative to generate said unvoiced phonetic information signals as linear predictive coding signals representative of a vocal tract filter.

3. Apparatus as defined by claim 2, wherein said stored unvoiced phonetic information representations are also in the form of linear predictive coding signals.

4. Apparatus as defined by claim 1, wherein said means for storing unvoiced phonetic information representations comprises means for storing unvoiced phonetic information from a number of training utterances which are respectively associated with said mouth positions.

5. Apparatus as defined by claim 2, wherein said means for storing unvoiced phonetic information representations comprises means for, storing unvoiced phonetic information from a number of training utterances which are respectively associated with said mouth positions.

6. Apparatus as defined by claim 1, further comprising means responsive to the determined representations for producing video mouth positions in conjunction with the sound track.

7. Apparatus as defined by claim 3, further comprising means responsive to the determined representations for producing video mouth positions in conjunction with the sound track.

8. Apparatus as defined by claim 5, further comprising means responsive to the determined representations for producing video mouth positions in conjunction with the sound track.

9. A method for producing lip-synching for a spoken sound track, comprising the steps of:

storing, for each of a number of mouth positions, an unvoiced phonetic information representation associated with a mouth position;

generating, in response to samples of sound from the sound track, unvoiced phonetic information signals for the samples;

comparing the unvoiced phonetic information signals with the stored unvoiced phonetic information representations to determine which of the stored representations most closely matches the unvoiced phonetic information signals; and storing the determined representations in time correspondence with the sound track.

10. The method as defined by claim 9, wherein said generating step comprises generating said unvoiced phonetic information signals as linear predictive coding signals representative of a vocal tract filter.

11. The method as defined by claim 9, wherein the step of storing unvoiced phonetic information representations comprises storing unvoiced phonetic information from a number of training utterances which are respectively associated with said mouth positions.

12. The method as defined by claim 10, wherein the step of storing unvoiced phonetic information representations comprises storing unvoiced phonetic information from a number of training utterances which are respectively associated with said mouth positions.

13. The method as defined by claim 9, further comprising the step of producing, in response to the determined representations, video mouth positions in conjunction with the sound track.

14. The method as defined by claim 10, further comprising the step of producing, in response to the determined representations, video mouth positions in conjunction with the sound track.

15. The method as defined by claim 12, further comprising the step of producing, in response to the determined representations, video mouth positions in conjunction with the sound track.

16. A method for receiving input training utterances for each of a number of different mouth positions, and for subsequently lip-synching a spoken sound track, comprising the steps of:

(a) storing, for each training utterance, an unvoiced phonetic information representation of a sample of sound from the utterance;

(b) generating, for a sample of the sound track, unvoiced phonetic information signals;

(c) comparing the unvoiced phonetic information signals with the stored unvoiced phonetic information representation for each training utterance, and determining which training utterance provides the best match;

(d) storing, in conjunction with the time of the sample of the soundtrack, an indication of the mouth position corresponding to the training utterance which provided the best match; and repeating steps (b), (c) and (d) for subsequent samples of the sound track.

17. The method as defined by claim 16, wherein said generating step (b) comprises generating said unvoiced phonetic information signals as linear predictive coding signals representative of a vocal tract filter.

18. The method as defined by claim 16, further comprising the step of producing, in response to the determined indications of step (d), video mouth positions in conjunction with the sound track.

19. The method as defined by claim 17, further comprising the step of producing, in response to the determined indications of step (d), video mouth positions in conjunction with the sound track.

* * * * *